Figure 1:
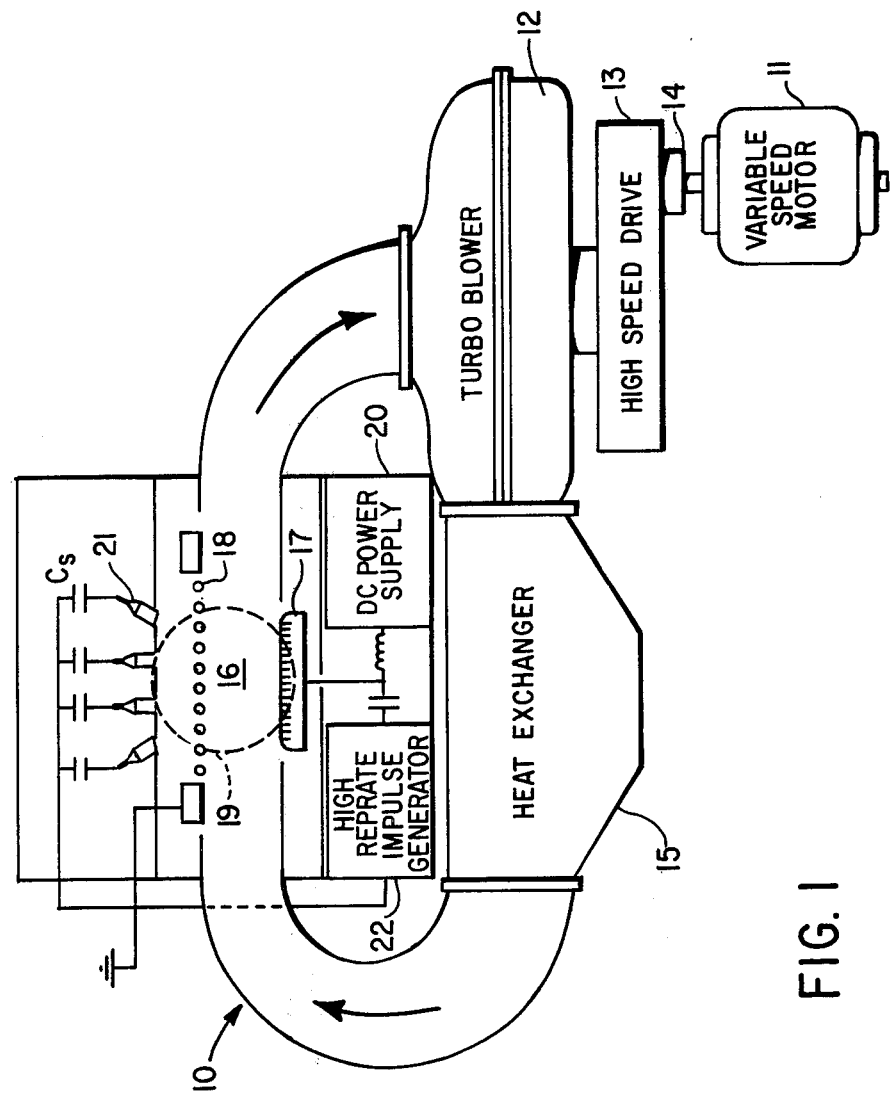

United States Patent [19]

Seguin et al.

[11] 4,288,758

[45] Sep. 8, 1981

[54] HIGH POWER LASER AND CATHODE STRUCTURE THEREOF

[75] Inventors: Herb J. J. Seguin; John Tulip; Kyong H. Nam, all of Edmonton, Canada

[73] Assignee: Canadian Patents & Dev. Limited, Ottawa, Canada

[21] Appl. No.: 64,093

[22] Filed: Aug. 6, 1979

[30] Foreign Application Priority Data

Jun. 14, 1979 [CA] Canada .................................. 330140

[51] Int. Cl.$^3$ .............................................. H01S 3/09
[52] U.S. Cl. ...................... 331/94.5 PE; 331/94.5 G; 331/94.5 D
[58] Field of Search .................. 331/94.5 D, 94.5 PE, 331/94.5 GP; 313/232, 172

[56] References Cited

U.S. PATENT DOCUMENTS 4,080,578  3/1978  Farish et al. .................. 331/94.5 PE

OTHER PUBLICATIONS

"Comparison of Two High-Repetition-Rate Pulsed $CO_2$ Laser Discharge Geometries", by Faszer et al., *J. Appl. Phys.* 51 (11), Nov. 1980, p. 6624.

*Primary Examiner*—William L. Sikes
*Assistant Examiner*—Léon Scott, Jr.
*Attorney, Agent, or Firm*—James R. Hughes

[57] ABSTRACT

A cathode structure for gas lasers comprising a flat plate of non-conducting material positioned in the laser in spaced relation to the laser anode to define a discharge region therebetween, a two-dimensional array of metal sub-electrode rods passing through the plate and having their upper ends lying flush with the surface of the plate, a block of dielectric material positioned below the plate and containing a series of transverse channels therein, electric current conductors lying in the channels and adapted for connection to a power supply, the lower ends of the said rods passing through openings in the block into the channels to define a predetermined uniform gap between the ends of the rods and the electrical conductor, and a liquid electrolyte solution filling the channels and electrically connecting the sub-electrode rods and the conductors.

5 Claims, 9 Drawing Figures

HIGH POWER LASER AND CATHODE STRUCTURE THEREOF

This invention relates to gas lasers and more particularly to a high power pulser sustained C.W. $CO_2$ laser and a cathode structure for use therein.

Continuous Wave Gas transport, Electric discharge $CO_2$ lasers, are currently experiencing an increased application in the scientific and industrial community. Unique operational characteristics such as high specific power, good efficiency and ease of control, have made these devices particularly useful in the materials fabrication and processing field. Over the last years three different (E.D.L.) electric discharge laser types have evolved. These are: "Self-sustained", "Electron-Beam-sustained" and "Pulser sustained" devices. The basic differentiation between types is primarily a consequence of the method by which a plasma is created and maintained within the active volume. As is well known, "self-contained" machines rely on an avalanching DC field to simultaneously provide both volume ionization and vibrational pumping. Such discharges usually operate in a negative resistance "normal glow" regime and hence require external ballast for current stabilization. In Electron beam-sustained E.D.L.'s a C.W. electron gun provides ionization while input energy for vibrational excitation is supplied by an auxiliary, non-self-sustained D.C. discharge. Ionization and laser pumping are thus performed separately, with a concomitant increased capacity for optimization and control. A somewhat similar situation exists in pulser-sustained lasers, except here ionization is derived from controlled Townsend cascade rather than by high energy electron beam impact. This latter difference could conceivably make pulser-sustained devices simpler, less expensive and more efficient to operate.

The operational characteristics of the pulser-sustained laser have not been greatly investigated. The following papers provide information on earlier work: James P. Reilly, "Pulser-sustainer electric-discharge laser", J. Appl. Phys., Vol. 43, No. 8, p. 3411, Aug. 1972. C. J. Buczek, R. J. Freiberg, D. P. Chenausky and R. J. Wayne, "Magnetic Stabilization of the Plasma Column in Flowing Molecular Lasers", Proc. IEEE, Vol. 59, No. 4, p. 659, Apr. 1971. A. E. Hill, "Continuous uniform excitation of medium pressure $CO_2$ Laser plasma by means of controlled avalanche ionization", Appl. Phys. Lett., Vol. 22, No. 12, p. 670, June 1973.

U.S. Pat. No. 4,080,578 issued Mar. 21, 1978 to Farish, et al describes a D.C. excitation system for high pressure gas lasers. In FIG. 3B of this patent, an electrolytic bath is shown as a possible replacement for the more conventional discrete ballast resistors.

It is an object of the present invention to provide highly efficient multi-element cathode structure for high power gas lasers.

This and other objects of the invention are achieved by a cathode structure for gas lasers comprising a flat plate of non-conducting material positioned in the laser in spaced relation to the laser anode to define a discharge region therebetween, a two-dimensional array of metal sub-electrode rods passing through the plate and having their upper ends lying flush with the surface of the plate, a block of dielectric material positioned below the plate and containing a series of transverse channels therein, electric current conductors lying in the channels and adapted for connection to a power supply, the lower ends of the said rods passing through openings in the block into the channels to define a predetermined uniform gap between the ends of the rods and the electrical conductor, and a liquid electrolyte solution filling the channels and electrically connecting the sub-electrode rods and the conductors.

Figure 2:
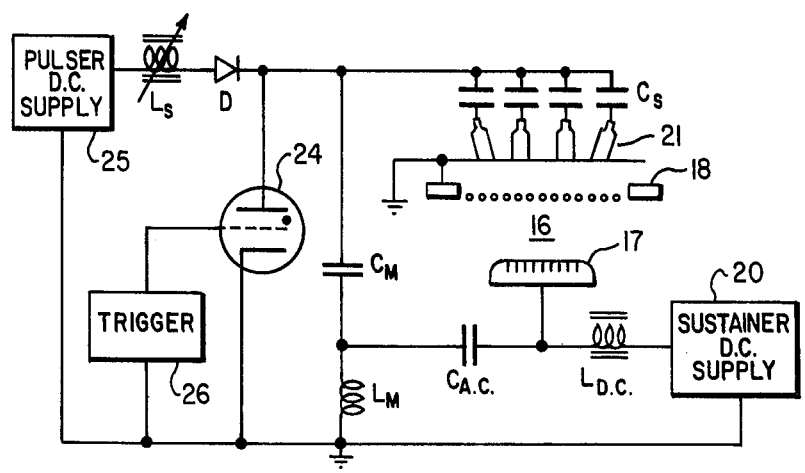
Figure 3:
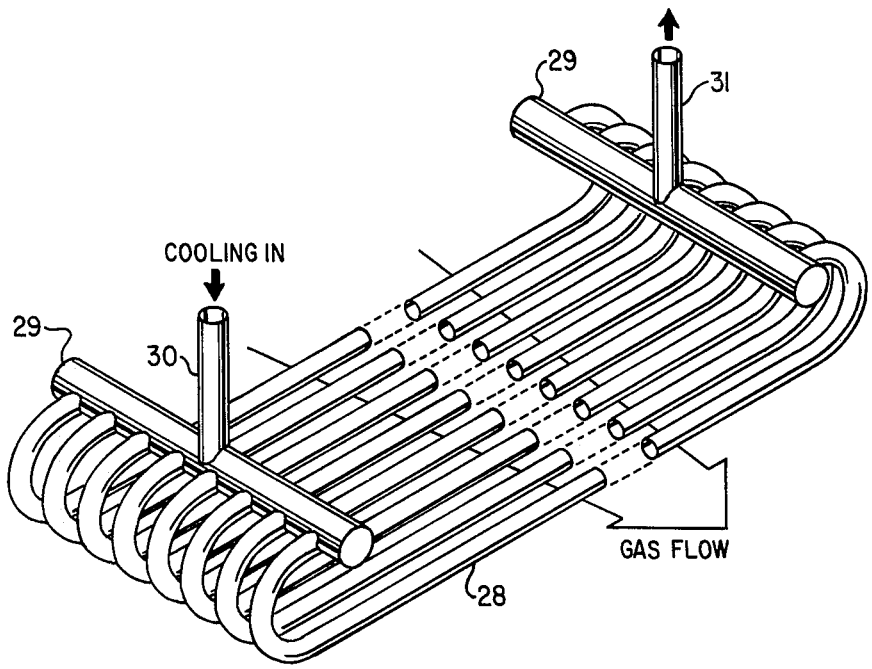
Figure 4:
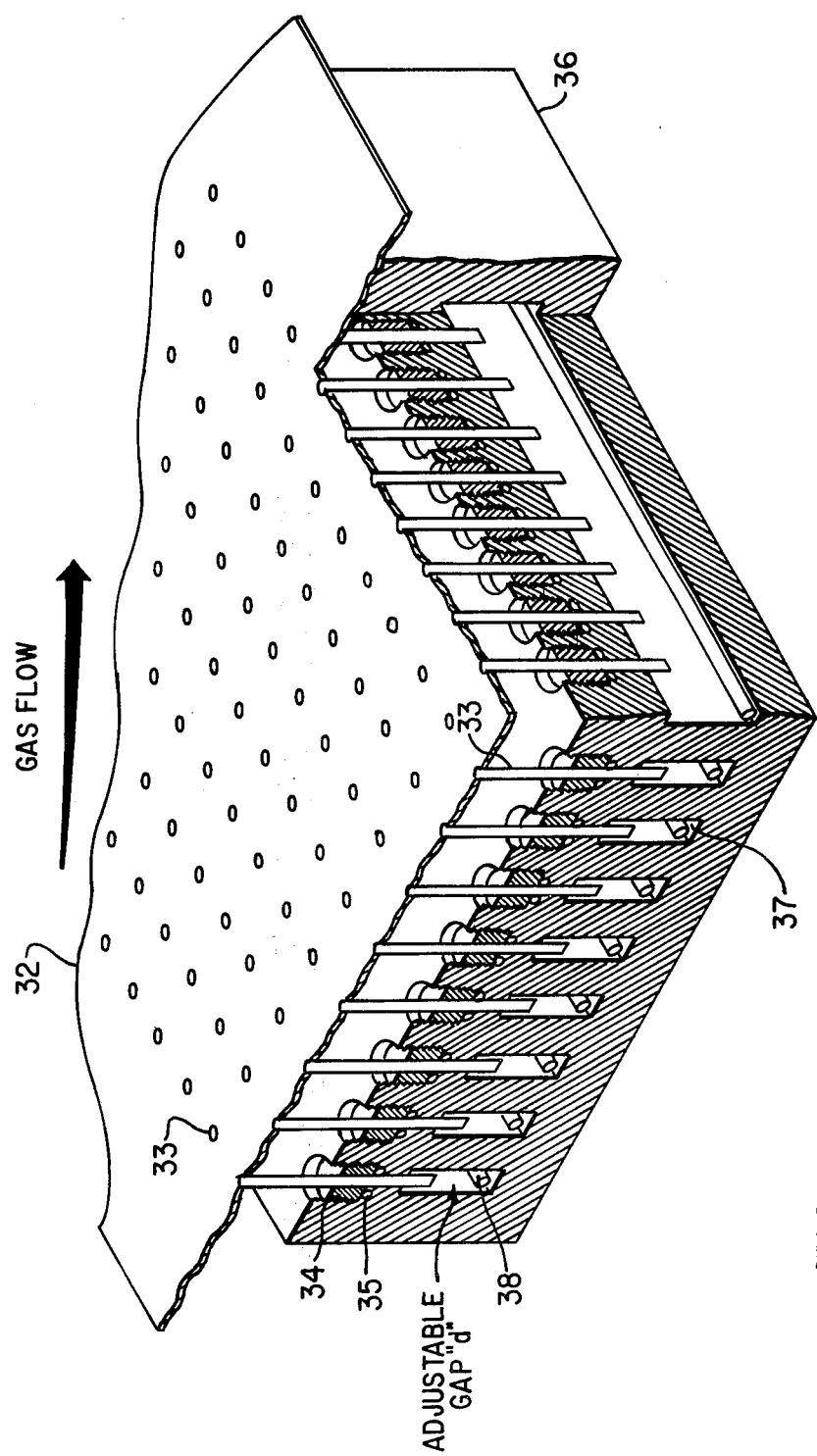
Figure 5:
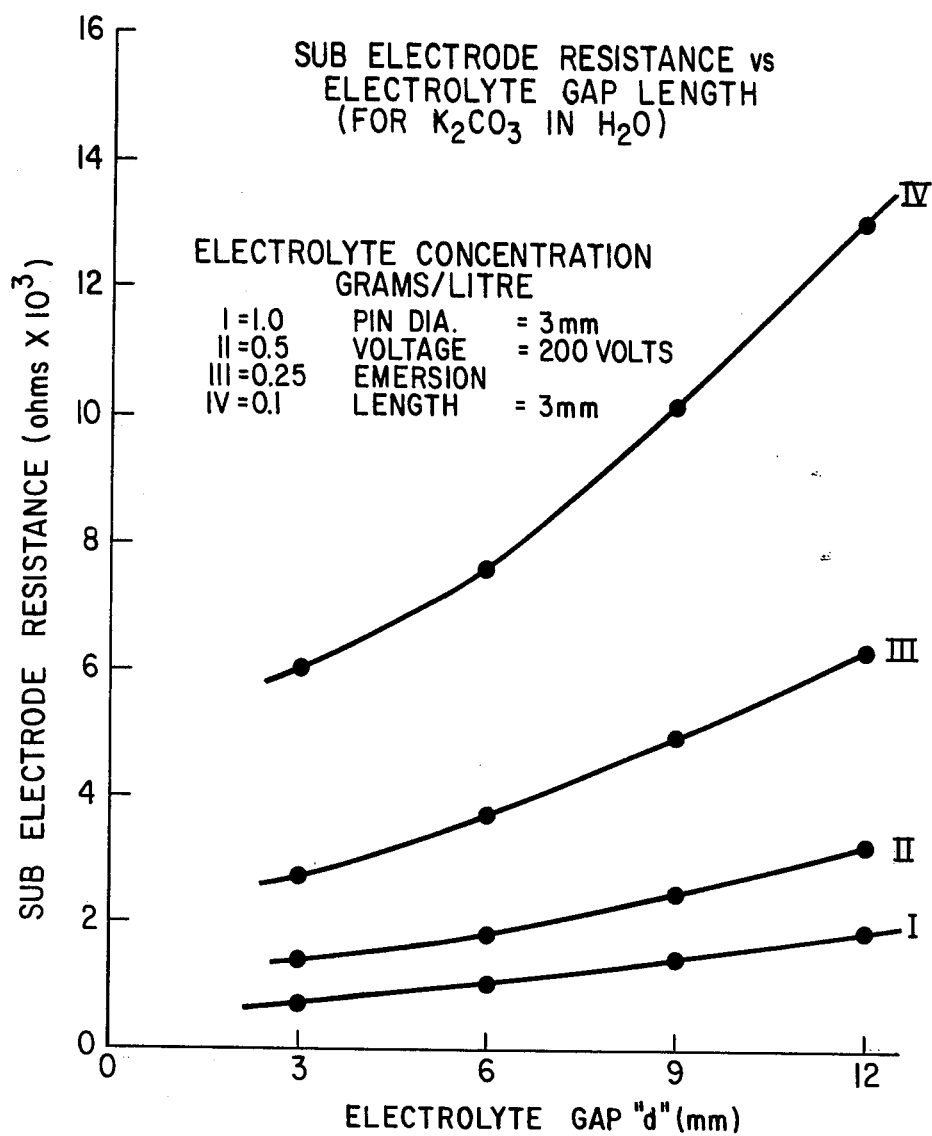
Figure 6:
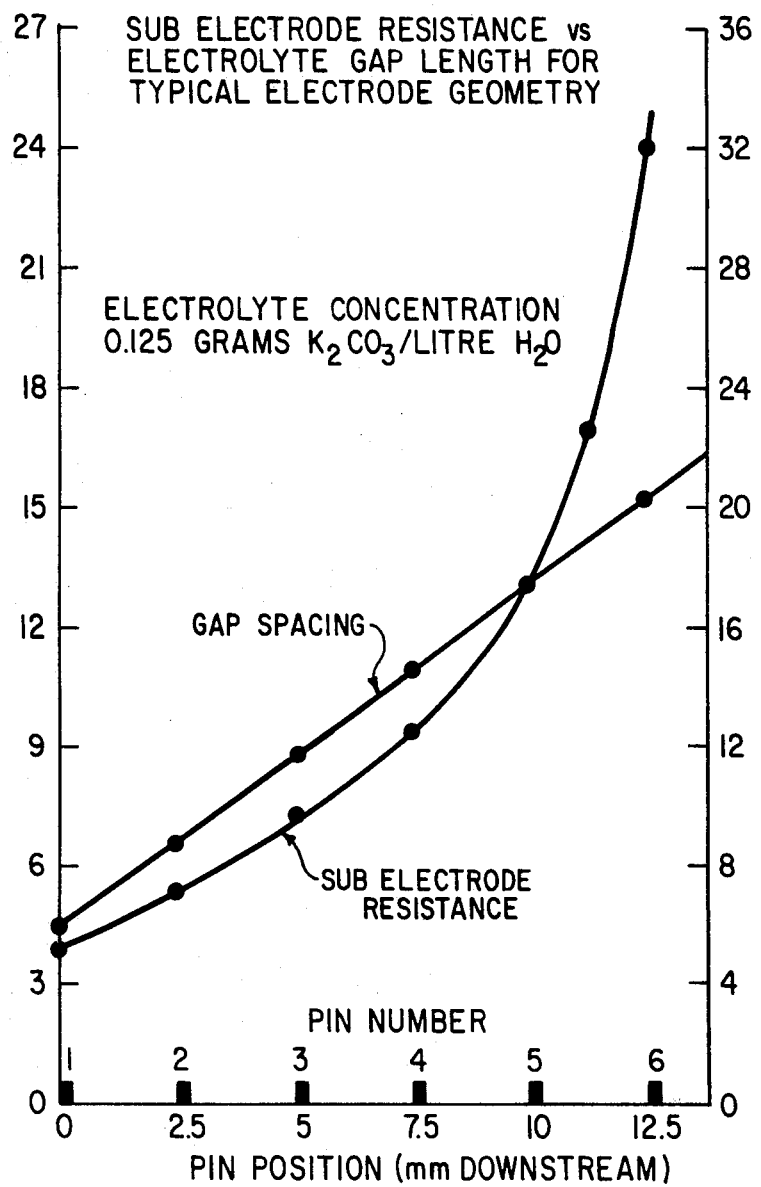
Figure 9:
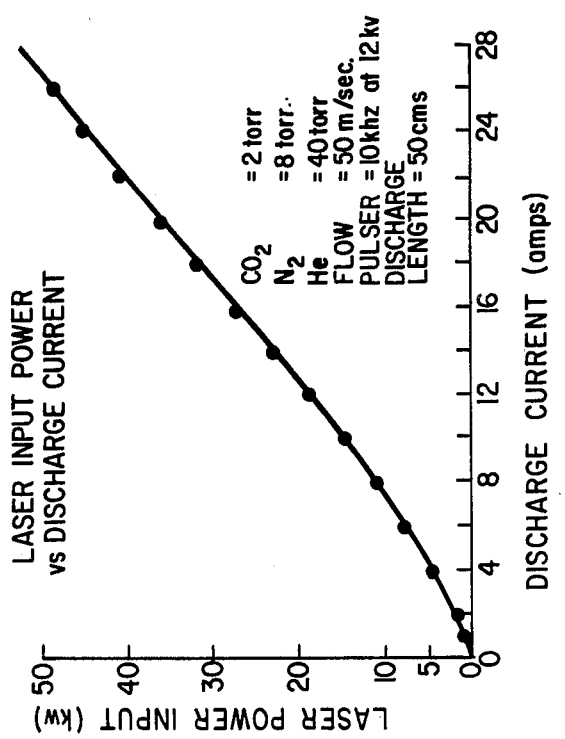
Figure 7:
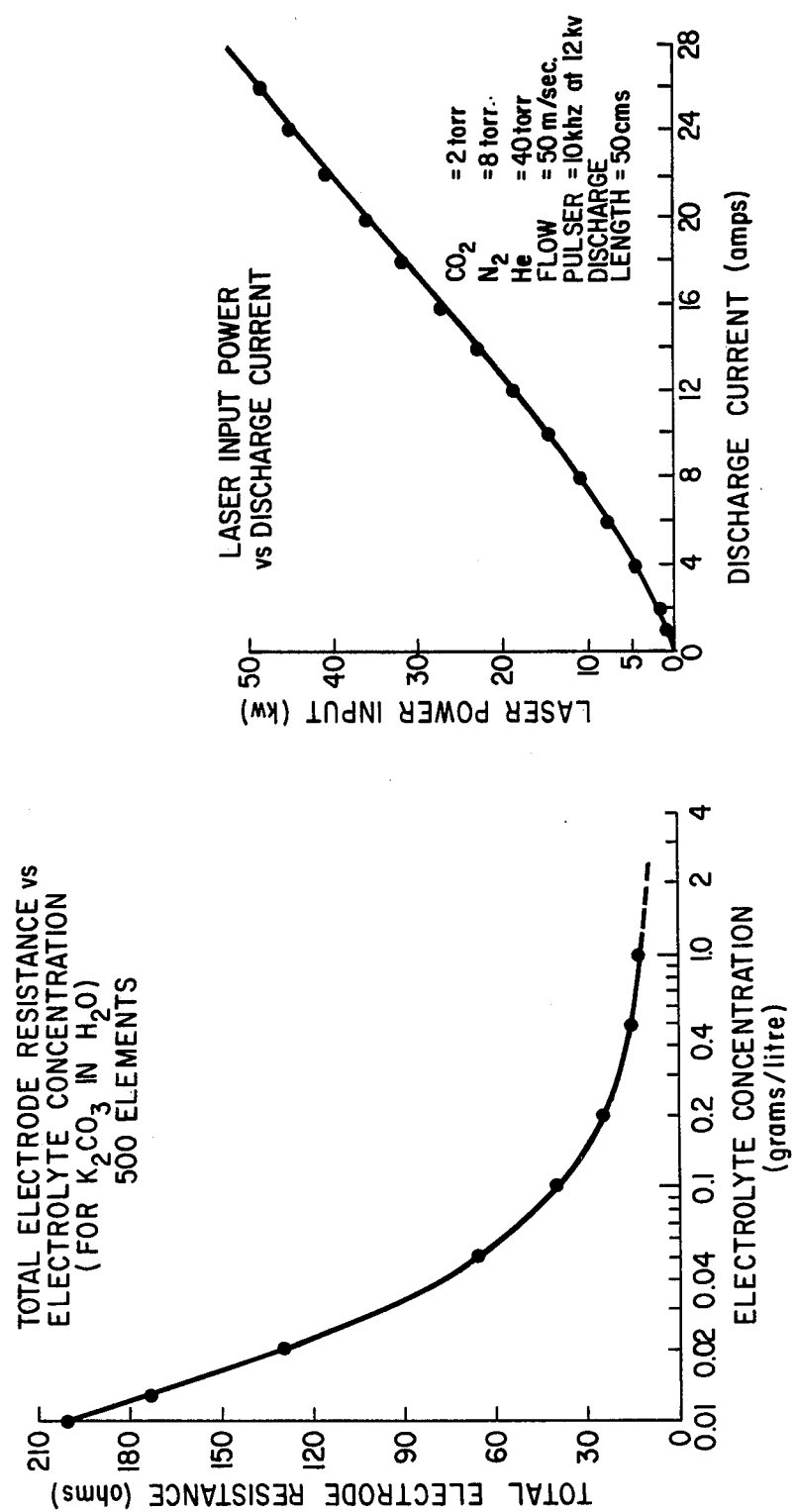
Figure 8:
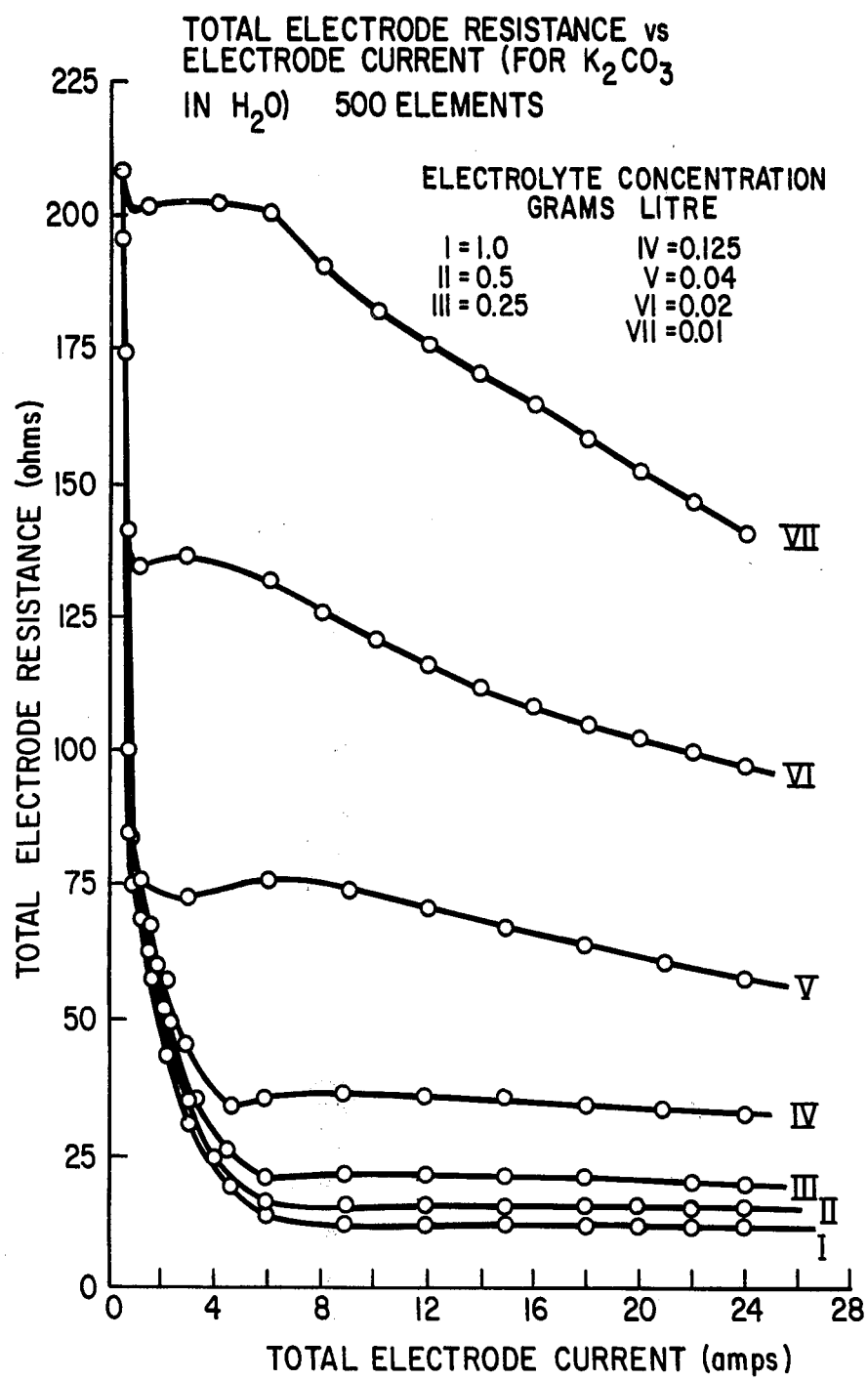

In drawings which illustrate an embodiment of the invention,

FIG. 1 is a cross-section of a gas transport $CO_2$ laser,
FIG. 2 is a circuit diagram of the thyratron pulser,
FIG. 3 is a schematic diagram of the anode structure,
FIG. 4 is partially broken pictorial diagram of the multi-element cathode,
FIG. 5 is a graph plotting such electrode resistance vs electrolyte gap,
FIG. 6 is a graph showing gap variation and pin resistance for a specific cathode geometry,
FIG. 7 is a graph showing total electrode resistance vs. electrolyte concentration for a 500 element composite cathode,
FIG. 8 is a graph of total electrode resistance vs electrode current for various electrolyte concentrations, and
FIG. 9 is a graph plotting laser power input to cathode current.

Referring to FIG. 1, a C.W. Gas transport $CO_2$ Laser is shown in schematic form. The structure is basically a closed cycle wind tunnel 10 made up of motor 11 driving turbo blower 12 through high speed drive 13 and vacuum shaft seal 14, a heat exchanger 15, and a laser cavity region 16. A transverse electrode system comprising multi-element cathode 17 and water cooled tubular anode 18 is positioned in relation to the laser cavity as are conventional laser mirrors 19 (shown dotted). The cathode is connected to a D.C. power supply 20 and the anode is connected to ground.

A multi-element U.V. source array of spark plugs 21 is connected via capacitors $C_s$ to a high repetition rate impulse generator 22 also connected to the cathode. The gas transport facility provides a variable gas flow-velocity through the active region 16. The electrodes are mounted with a predetermined gap mutually orthogonal to both the flow and laser optic axes.

The device is photo-initiated, impulse enhanced, electrically excited and the requisite plasma density is generated and maintained through sequential photo and impulse ionization processes, made to occur in a controlled repetitive manner. The active volume 16 is initially photo-preionized by the extended array of U.V. spark sources 21 connected to a pulser circuit incorporating thyration 24, pulser D.C. supply 25, trigger 26, saturable inductor $L_s$ and hold off diode D, storage capacitor $C_M$, and inductor $L_m$, as shown in FIG. 2. The pulser also A.C. couples a controlled avalanching waveform to the multi-element cathode via impulse coupling capacitor $C_{A.C.}$. In this manner the electron density is increased to the required value and by operating the photo-impulser ionization system at a high repetition rate a continuous plasma density is maintained within the active region.

The anode 18 is shown in more detail in FIG. 3 and is formed of a series of spaced copper tubes 28 connected to end manifolds 29 connected to coolant supply 30 and discharger 31.

The multi-element cathode 17 is shown in broken form in FIG. 4. It comprises a top plate 32 of non-conducting (preferably ceramic) material having an extended surface mounted in the discharge region in relation to the anode, and the gas flow between. A two-dimensional array of sub-electrode metal (preferably stainless steel) rods 33 pass through the plate with their upper ends lying flush with the upper surface thereof. These rods extend through clamping collars 34 and 0-ring seals 35 into a block of dielectric material 36 into a series of transverse channels 37 formed therein. These channels contain current busses 38 which are connected in parallel to the power supply (see FIG. 2). A gap distance "d" is defined between the lower end of the electrode rods 33 and the current busses and this distance is adjustable by moving the sub-electrode structure up or down through the clamping collars. A liquid electrolyte flows in the channels which are connected to suitable electrolyte reservoirs and pumps (not shown).

The preferred electrolyte material is potassium carbonate ($K_2CO_3$) as solute. These material combinations exhibit not only a negligible erosion rate but also provide a gentle cleansing electro-chemical reaction at the metal-electrolyte interfaces. The conducting surfaces are thus continuously kept free of any deposit by this electro-chemical polishing action ensuring consistency in the V-I characteristic.

Adjustment of either the channel gaps, pin immersion length, or electrolyte concentration provides a convenient method of control and optimization.

FIG. 8 shows the resistance presented by an individual sub electrode as a function of the fluid gap. The data was taken at 200 volts on a 3 mm. diameter stainless steel pin immersed 3 mm. into varying strengths of $K_2CO_3$ electrolyte. It is clear from this data that a wide range of elemental resistance is obtainable in this manner. In actual cathode fabrication, such as FIG. 4, it is expedient to design for a constant channel size with a uniformly increasing fluid gap and pin immersion length in the direction of gas flow. This arrangement provides better current distribution over the electrode surface and thus results in a more uniform gain profile.

FIG. 6 shows the typical gap variations with corresponding pin resistances used in a test cathode. The overall electrode resistance presented by this 500 element composite structure is shown in FIG. 7, as a function of electrolyte concentration. The resistance vs current characteristic displayed by this cathode is outlined in FIG. 8. At low currents the device gives a high valued nonlinear resistance; which quickly drops to a constant low value at higher power levels.

For optimum operating conditions the electrolyte conductivity is adjusted to be as high as possible; consistent with adequate current distribution. Too weak a solution results in a higher overall electrode resistance with needless power dissipation. The optimum solute concentration for a particular cathode geometry is dependent on several parameters such as pin size and density, gap immersion length, laser gas mixture and pressure. For the wide range of geometries and operating conditions used in this type of laser, the optimum fluid concentration has been found to lie within the range of about 1 to 0.1 grams per liter.

This relatively simple and compact cathode structure eliminates the need for complicated resistor ballasting networks and in addition is highly damage resistant. In the event of an arc in the discharge the increased elemental current causes localized heating and evaporization of the conducting fluid. The high resistance gas bubble, momentarily so formed, then acts to extinguish the arc. Uniform current distribution is therefore resumed without experiencing component damage. Such desirable performance is not generally observed in other types of multi-element or pin electrode systems, where arc occurances often destroy the element ballasting resistors.

The D.C. power input to this non-selfsustained laser is shown in FIG. 9 as a function of plasma current. Laser power input is seen to increase approximately linearly up to the instability limit of about 50 KW.

In this above description the cathode has been described in relation to a specific type of laser. It will be realized that this cathode would have application in the design of a wide range of laser types especially high power gas flow types. Although a $K_2CO_3$ solution has been found to be a highly effective electrolyte material, other materials could be used. These include: copper sulphate, aluminum sulphate, and other metal salt electrolyte materials.

We claim:

1. In an electric discharge gas laser, the improvement comprising:
   (a) a flat plate of non-conducting material positioned in the laser in spaced relation to the laser anode to define a discharge region therebetween,
   (b) a two-dimensional array of metal sub-electrode rods passing through the plate and having
   (c) their upper ends lying flush with the surface of the plate,
   (d) a block of dielectric material positioned below the plate and containing a series of transverse channels therein,
   (e) electric current conductors lying in the channels and adapted for connection to a power supply,
   (f) the lower ends of the said rods passing through openings in the block into the channels to define a predetermined uniform gap between the ends of the rods and the electrical conductor, and
   (g) a liquid electrolyte solution filling the channels and electrically connecting the sub-electrode rods and the conductors.

2. A cathode structure for gas lasers as in claim 1 wherein the liquid electrolyte is a solution of potassium carbonate in water.

3. A cathode structure for gas lasers as in claim 2 wherein the potassium carbonate solution has a concentration of about 1 to 0.1 grams per liter.

4. A cathode structure for gas lasers as in claim 1 wherein the sub-electrode rods are made of stainless steel.

5. A cathode structure for gas lasers as in claim 1 wherein the sub-electrode rods pass through the openings in the block via sealing and clamping means adapted to allow movement of the rods in relation to the current conductors such as to change gap distance therebetween.

* * * * *